United States Patent
Ishida et al.

(10) Patent No.: US 7,350,816 B2
(45) Date of Patent: Apr. 1, 2008

(54) IMPACT ABSORBING STEERING COLUMN DEVICE

(75) Inventors: Ryuuichi Ishida, Gunma-ken (JP);
Toshimichi Takano, Gunma-ken (JP);
Masaki Tomaru, Gunma-ken (JP)

(73) Assignee: NSK Ltd., Tokyo (JP)

( * ) Notice: Subject to any disclaimer, the term of this patent is extended or adjusted under 35 U.S.C. 154(b) by 383 days.

(21) Appl. No.: 10/506,989

(22) PCT Filed: May 7, 2003

(86) PCT No.: PCT/JP03/05685

§ 371 (c)(1),
(2), (4) Date: Sep. 9, 2004

(87) PCT Pub. No.: WO03/095287

PCT Pub. Date: Nov. 20, 2003

(65) Prior Publication Data

US 2005/0104355 A1    May 19, 2005

(30) Foreign Application Priority Data

May 8, 2002    (JP)    ............................. 2002-132964

(51) Int. Cl.
*B62D 1/19*    (2006.01)
(52) U.S. Cl. .................. 280/777; 74/492; 280/775

(58) Field of Classification Search ................. 280/777,
280/779, 775, 771; 74/492, 493; *B62D 1/19*
See application file for complete search history.

(56) References Cited

U.S. PATENT DOCUMENTS 5,979,860 A * 11/1999 Jurik et al. .................. 248/548
6,659,504 B2 * 12/2003 Riefe et al. .................. 280/777

FOREIGN PATENT DOCUMENTS

| DE | 195 15 009 | 12/1995 |
| EP | 1 093 990 A | 5/2001 |
| GB | 2 290 059 | 12/1995 |
| JP | UM 59-5474 | 1/1984 |
| JP | UM 59-147673 | 10/1984 |
| JP | UM 59-180963 | 12/1984 |
| JP | 61-125963 | 6/1986 |
| JP | 7-47961 | 2/1995 |
| JP | 7-329796 | 12/1995 |
| JP | 11-129915 | * 5/1999 |
| JP | 2002-59853 | * 2/2002 |

* cited by examiner

*Primary Examiner*—Eric Culbreth
(74) *Attorney, Agent, or Firm*—Miles & Stockbridge P.C

(57) ABSTRACT

A spacer is interposed between a body-side bracket and a column-side bracket for retaining a steering column. A pin insertion hole through which a supporting pin is passed is formed in the spacer. A portion of the spacer to be broken by the shock of collision is formed in a region of the spacer surrounding the pin insertion hole.

10 Claims, 5 Drawing Sheets

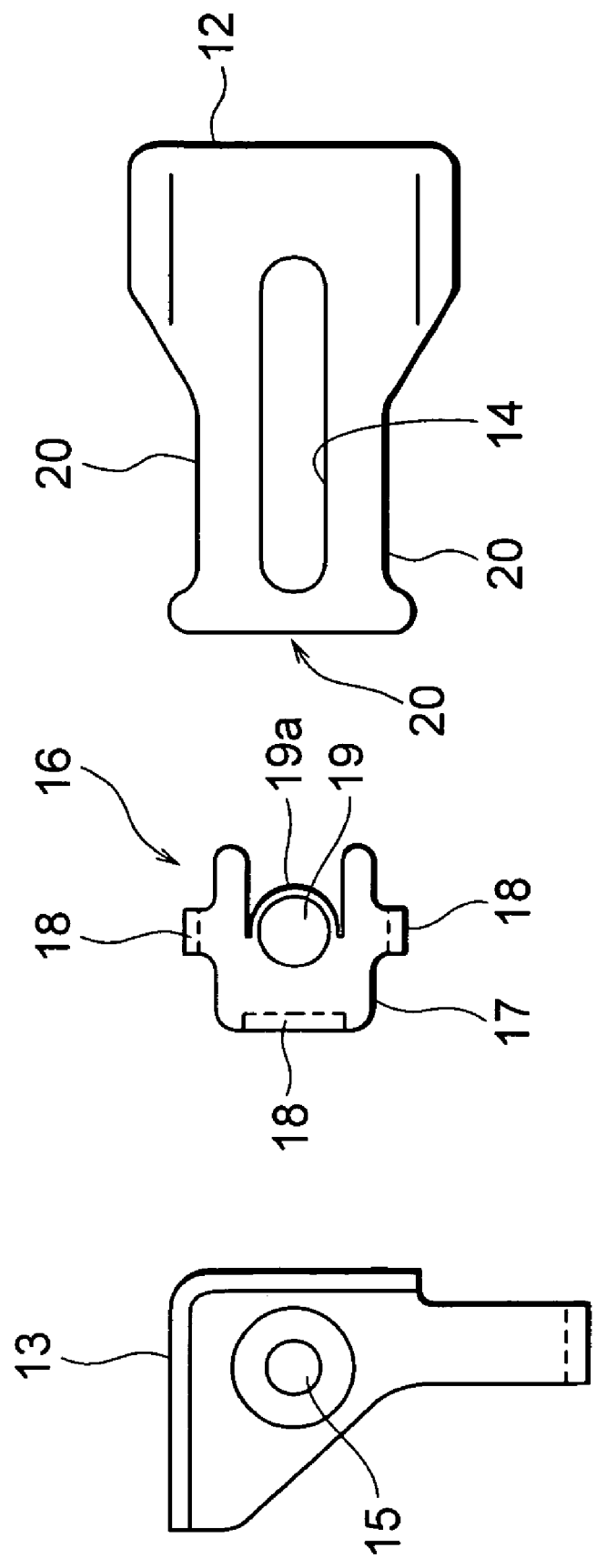

LOAD DIAGRAM OF THE SPACER

IMPACT ABSORBING STEERING COLUMN DEVICE

TECHNICAL FIELD

The present invention relates to a shock absorbing steering column apparatus which can prevent deterioration of the rigidity of a lower bracket while making a disconnecting load of a steering column to be comparatively small in the lower bracket, so as to smoothly disconnect the steering column from the lower bracket, thereby securely guiding the steering column to the front of a car without dropping the steering column downward.

BACKGROUND ARTS

When a car has a collision, the driver may collide with the steering wheel secondarily due to inertia. Thus, in order to protect drivers, a shock absorbing steering column apparatus has been widely employed.

In a shock absorbing steering column apparatus, when a driver has a secondary collision and the shock energy of this collision works from the rear part to the front part of the car, the steering column is disconnected from the car body to move to the front part of the car while being collapsed, and absorbs the shock energy meanwhile.

Generally, the steering column is supported and secured to the car body at two positions, that is, at an upper bracket on the rear part of the car and a lower bracket at the front part of the car.

The upper bracket of the steering column in the rear part of the car is provided with the shock absorbing mechanism described above, in addition to a tilt lock mechanism, and the like.

On the other hand, the lower bracket in the front part of the car is provided with a supporting pin serving as the center of tilting so as to move the steering column in an inclined manner at the time of a tilt operation. At the same time, such a structure is employed as smoothly disconnecting the steering column from the lower bracket when the steering column is collapsed to move to the front part of the car at the secondary collision described above, so that the steering column can be securely guided to the front part of the car without falling downward.

For example, in Japanese Patent Application Laid-Open No. 2002-59853, a column-side lower bracket which is secured to a steering column is formed with an axially elongated hole and a partition member which is cut up from the inner periphery of this axially elongated hole.

The column-side lower bracket is brought into contact with a body-side lower bracket which is secured to the car body, and a supporting pin is passed through these both lower brackets. In this case, the supporting pin is passed through the partition member on the front side of the car inside the axially elongated hole of the column-side lower bracket.

When the tilt operation is performed, the column-side lower bracket can be inclined together with the steering column around the supporting pin serving as the center of the tilting.

At the secondary collision, when the steering column is collapsed to move to the front part of the car, the body-side lower bracket and the supporting pin remain stationary. On the other hand, the column-side lower bracket moves to the front part of the car together with the steering column. As a result, the partition member is broken by the supporting pin, whereby the steering column can be smoothly disconnected from the lower bracket.

After that, the column-side lower bracket is, while the axially elongated hole thereof is engaged with the supporting pin, moved to the front part of the car together with the steering column. Thus, since the structure is that the support pin is engaged with the axially elongated hole, it is possible to guide the steering column to the front part of car without fail without dropping the steering column downward.

However, in the structure disclosed in Japanese Patent Application Laid-Open No. 2002-59853 described above, the partition member which is broken in the secondary collision, has been cut up from the inner periphery of the axially elongated hole of the column-side lower bracket and is formed with the column-side lower bracket as a unitary structure, so that an elaborate processing thereon is not feasible.

When the partition member is broken and is deformed, the base of the partition member is swollen out, so that there is a fear that the steering column is not always smoothly disconnected since it may be caught when collapsed.

DISCLOSURE OF THE INVENTION

The present invention has been contrived taking the circumstance as described above into consideration, and an object thereof is to provide a shock absorbing steering apparatus which can make a disconnecting load of a steering column to be comparatively small in the lower bracket and, at the same time, can smoothly move a column bracket without a catch when it is collapsed, so as to smoothly separate the steering column from the lower bracket, thereby securely guiding the steering column to the front part of a car without dropping the steering column downward.

In order to achieve the above object, according to the present invention, there is provided a shock absorbing steering column apparatus which is arranged such that a steering column is secured and supported by a body-side bracket, a column-side bracket secured to the steering column, and a supporting pin passed through both of these brackets so that the column-side bracket is disconnected at the time of collision to absorb the shock. This shock absorbing steering column apparatus is characterized in that, while a spacer is interposed between the both brackets and is latched by either one of the both brackets, a pin insertion hole through which the supporting pin is passed is formed on the spacer, so as to form a shock time breaking portion to be broken by the shock in the surroundings thereof.

As described above, according to the present invention, the spacer is interposed between the column-side bracket and the body-side bracket, and the column-side bracket can be moved in an inclined manner together with the steering column around the supporting pin which serves as the tilting center when a tilt operation is performed.

At the secondary collision, when the steering column is collapsed to move to the front part of the car, the body-side lower bracket and the supporting pin remain stationary; meanwhile the column-side lower bracket and the main body of the spacer move to the front part of the car together with the steering column. As a result, the shock time breaking portion of the spacer is broken by the supporting pin, whereby the steering column can be smoothly disconnected from the body-side lower bracket.

After that, the column-side lower bracket is moved to the front part of the car, together with the steering column.

The spacer can be easily designed and processed since it is formed separately from the column-side lower bracket or the body-side lower bracket and can take a desired shape and structure.

Since it is the shock time breaking portion of the spacer which is broken by shock, and not the column-side bracket or the body-side bracket, it is possible to smoothly disconnect the steering column to securely guide it to the front part of the car without dropping the steering column downward.

In the shock absorbing steering column apparatus of the present invention, it is preferable that the body-side bracket is comprised of a body-side upper bracket in the rear part of the car and a body-side lower bracket in the front part of the car, the column-side bracket may comprise a column-side upper bracket in the rear part of the car and a column-side lower bracket in the front part of the car which are respectively corresponding to the body-side upper bracket in the rear part of the car and the body-side lower bracket in the front part of the car, the spacer may be interposed between the body-side lower bracket and the column-side lower bracket, and the main body of the spacer may be latched on either the column-side lower bracket or the body-side lower bracket.

Also, in the shock absorbing steering column apparatus of the present invention, it is preferable that the narrow breaking portion is extended to more forward part of the car, than the center of the insertion hole.

Also, in the shock absorbing steering column apparatus of the present invention, it is preferable that the narrow breaking portion is extended to the forwarder part of the car, than the center of the insertion hole.

Further, in the shock absorbing steering column apparatus of the present invention, the spacer may be formed of synthetic resin.

BRIEF DESCRIPTION OF THE DRAWINGS

FIG. 3A is a side view of a column-side lower bracket, FIG. 3B is a side view of a spacer, and FIG. 3C is a side view of the body-side lower bracket;

DETAILED DESCRIPTION OF THE PREFERRED EMBODIMENTS

A shock absorbing steering column apparatus according to an embodiment of the present invention will be described below with reference to drawings.

Figure 1A:
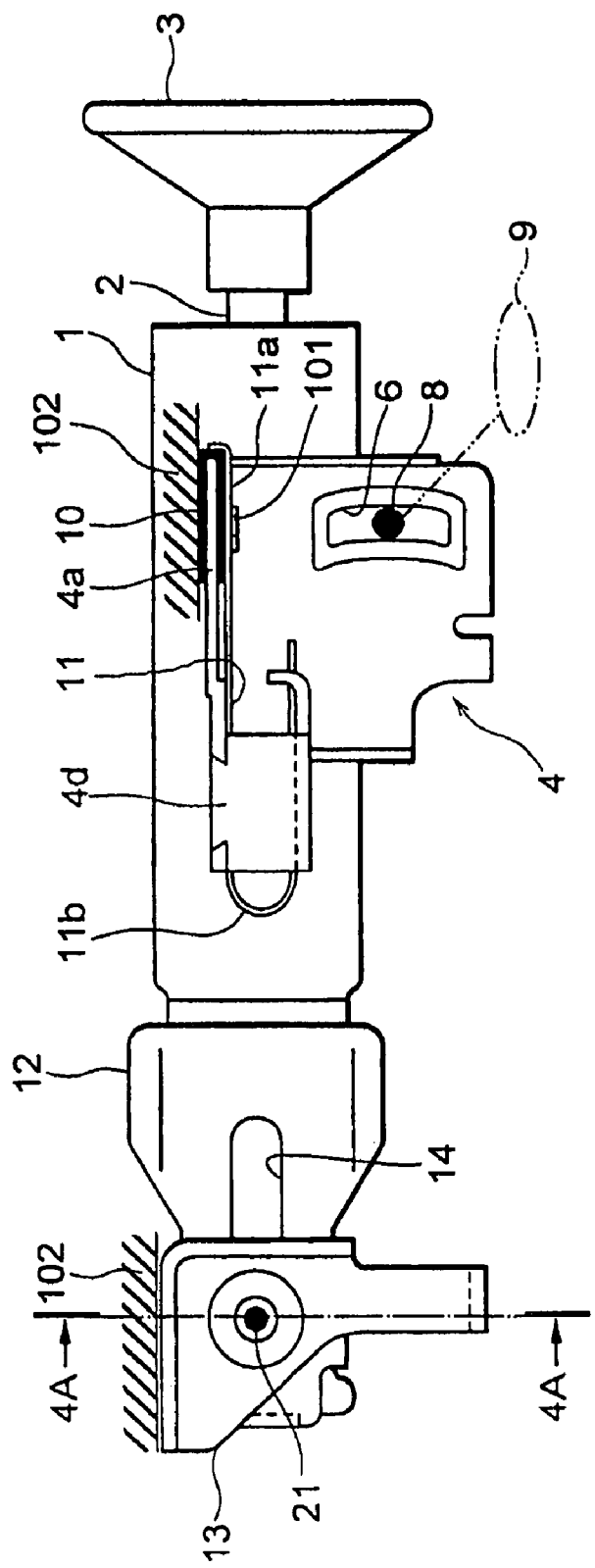
FIG. 1A is a side view of a shock absorbing steering column apparatus according to an embodiment of the present invention.
Figure 2:
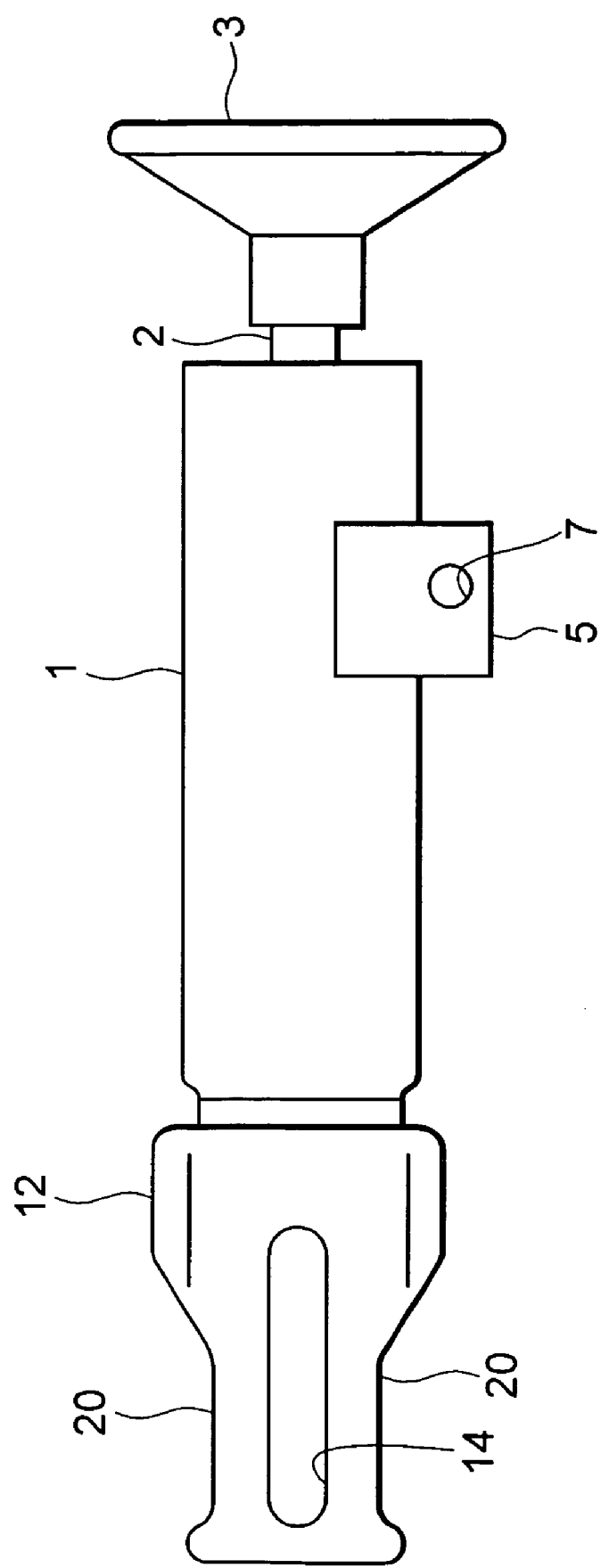
FIG. 2 is a side view of the shock absorbing steering column apparatus in a state that a body-side upper bracket and a body-side lower bracket are disconnected therefrom.
Figure 4A:
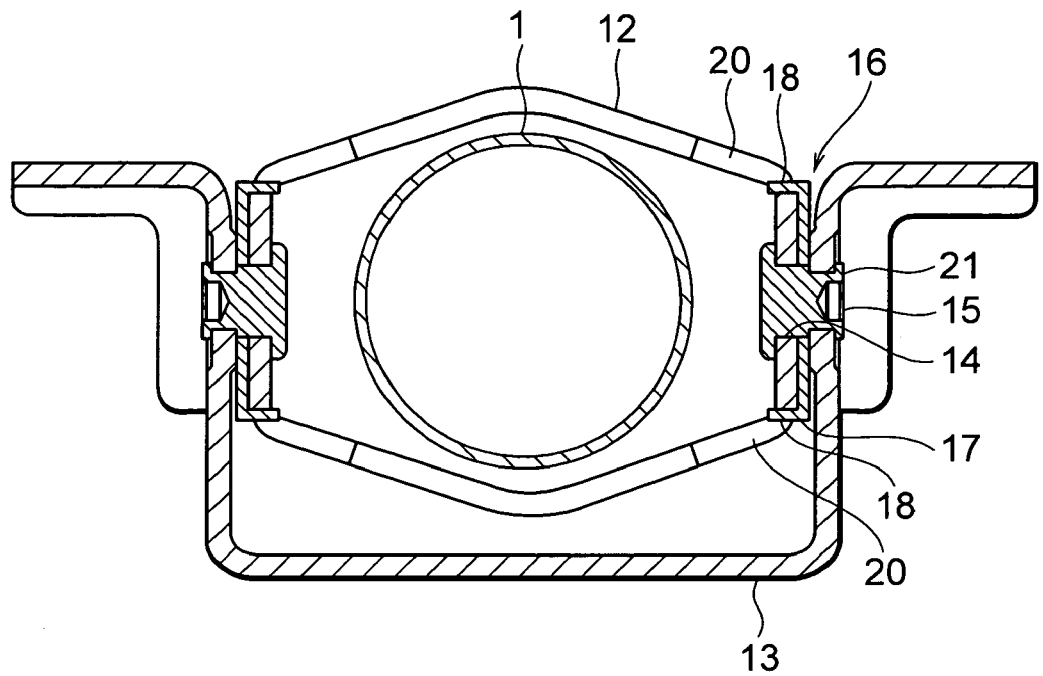
FIG. 4A is a cross-sectional view taken along the line 4A-4A in FIG. 1A.
Figure 4B:
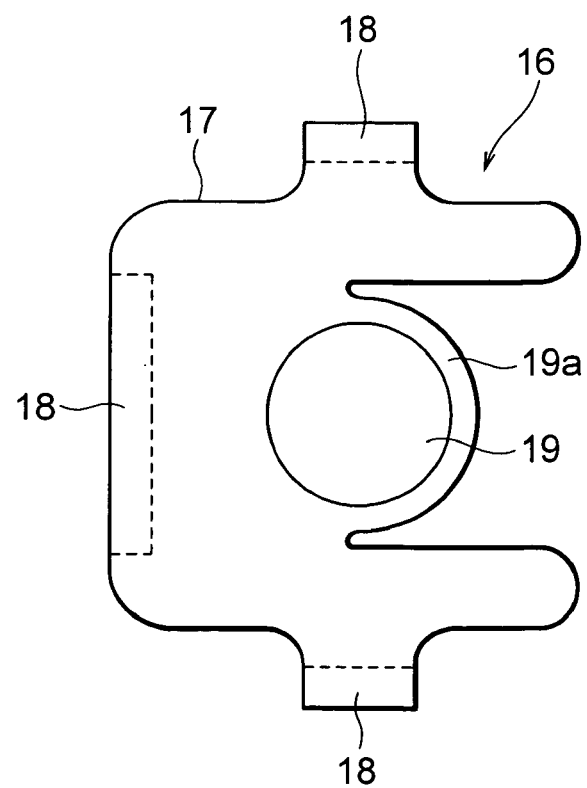
FIG. 4B is an enlarged side view of the spacer.
Figure 5:
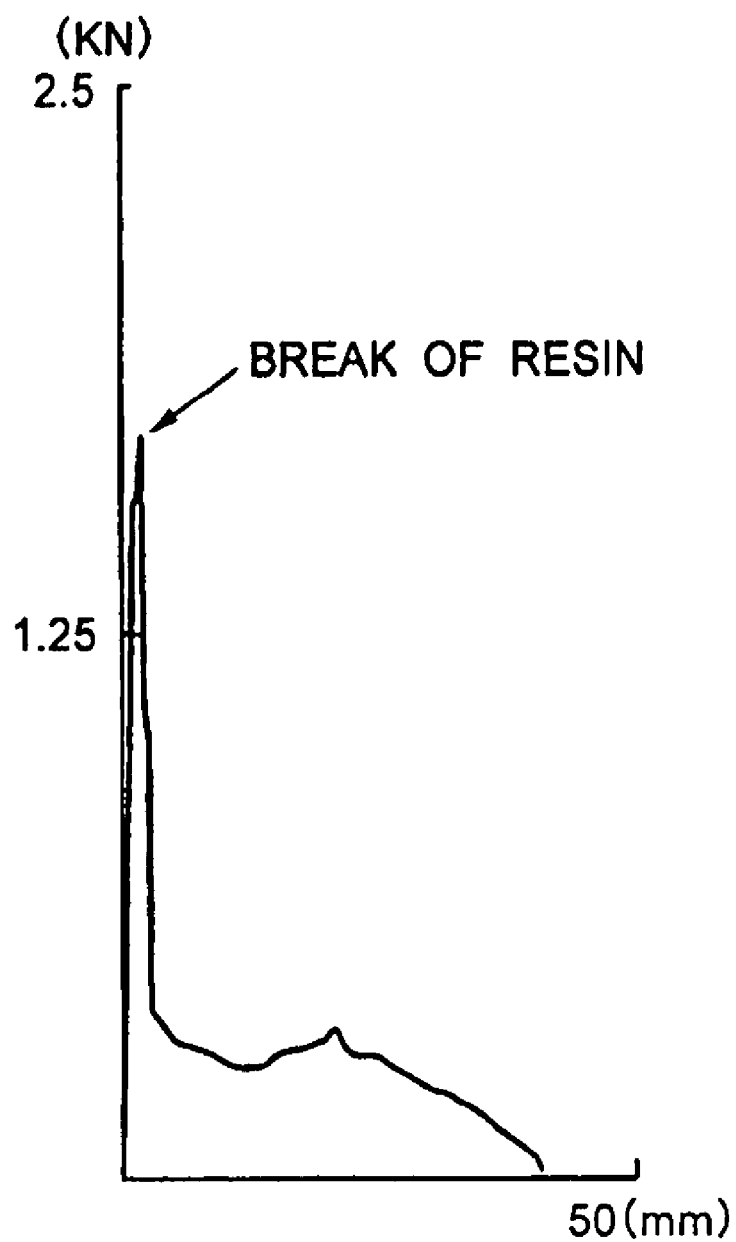
FIG. 5 is a diagram showing a load diagram of the spacer.

FIG. 1A is a side view of a shock absorbing steering column apparatus according to an embodiment of the present invention. FIG. 2 is a side view of the shock absorbing steering column apparatus in a state that a body-side upper bracket and a body-side lower bracket are disconnected therefrom. FIG. 3A is a side view of a column-side lower bracket, FIG. 3B is a side view of a spacer, and FIG. 3C is a side view of the body-side lower bracket. FIG. 4A is a cross-sectional view taken along the line 4A-4A in FIG. 1A, and FIG. 4B is an enlarged side view of the spacer. FIG. 5 is a diagram showing a load of the spacer.

Figure 1B:
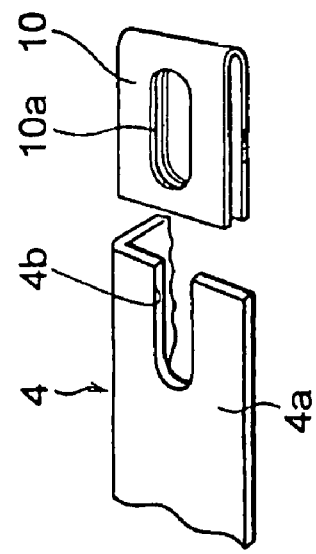
FIG. 1B is an enlarged perspective view of a part of the apparatus shown in FIG. 1A.

As shown in FIGS. 1A and 1B, a steering shaft 2 is rotatably supported on the steering column 1, and a steering wheel 3 is attached to the upper end of the steering shaft 2.

Note that the structure of the present embodiment is substantially laterally symmetrical when the steering shaft 2 is seen from the direction of the steering wheel 3. As a result, only one side in the drawing will be illustrated and described, except a part thereof.

The steering column 1 is supported and secured to the car body at two points, that is, an upper bracket in the rear part of the car and a lower bracket in the front part thereof.

The upper bracket in the rear part of the car is comprised of a body-side upper bracket 4 (tilt bracket) secured to the car body and a column-side upper bracket 5 (distance bracket in FIG. 2) secured to the steering column 1, and the both upper brackets 4 and 5 are brought into pressure contact with each other.

The body-side upper bracket 4 is formed with a tilt adjustment elongated hole 6, while the column-side upper bracket 5 is formed with a circular hole 7 (FIG. 2). A tilt fastening bolt 8 is passed through the tilt adjustment elongated hole 6 and the circular hole 7. An adjustment nut (not shown) and a tilt operation lever 9 are attached to one end of the tilt fastening bolt 8. These members constitute a tilt lock mechanism.

A flange 4a of the body-side upper bracket 4, which extends perpendicular to the plane of FIG. 1A, is formed with a notch 4b which is open toward the rear side of the car. A coating plate 10 for adjusting a frictional force is formed to sandwich the notch 4b in a substantially U shape. The upper bracket 4, the coating plate 10 and a shock absorbing plate 11 for absorbing a shock energy at a secondary collision are secured to a body-side strength member 102, which is indicated by slanting lines in the drawing, by the use of a bolt 101 passing through the notch 4b and a through hole 10a.

The shock absorbing plate 11 is secured to the body-side strength member 102 by the use of the bolt 101 at the base end portion 11a thereof, is extended to the front of the car inside a stand-out portion 4d of the body-side upper bracket 4 in a substantially U form and, after being bent at an arcuate portion 11b, is extended toward the rear part of the car inside the stand-out portion 4d.

At the secondary collision, the coating plate 10 is disconnected from the body-side upper bracket 4 due to the shock energy directed toward the front part of the car, and the body-side upper bracket 4 is moved to the front part of the car together with the steering column 1.

On this occasion, while the shock absorbing plate 11 remains on the car body side since the base end portion 11a thereof is secured to the car body with the bolt, the arcuate portion 11b and the like are plastically deformed (drawn) inside the stand-out portion 4d in the substantially U shape of the body-side upper bracket 4 which is moved to the front part of the car. It is possible to absorb the shock energy at the secondary collision due to this plastic deformation (drawing) of the shock absorbing plate 11. These members constitute a shock absorbing mechanism.

On this occasion, while the shock absorbing plate 11 remains on the car body side since the base end portion 11a thereof is secured to the car body with the bolt, the arcuate portion 11b and the like are plastically deformed (drawn) inside the stand-out portion 4b in the substantially U shape of the body-side upper bracket 4 which is moved to the front part of the car. It is possible to absorb the shock energy at the secondary collision due to this plastic deformation (drawing) of the shock absorbing plate 11. These members constitute a shock absorbing mechanism.

As shown in FIGS. 3A to 3C and FIGS. 4A and 4B, the lower bracket in the front part of the car is comprised of the column-side lower bracket 12 which is secured to the steering column 1, and the body-side lower bracket 13 which is brought into contact with the column-side lower bracket 12 through a spacer 16 and is secured to the body-side strength member 102.

An axially elongated hole 14 which is extended in the axial direction is formed on the column-side lower bracket 12, while a hole 15 is formed on the body-side lower bracket 13.

A spacer 16 formed of a synthetic resin is interposed between the column-side lower bracket 12 and the body-side lower bracket 13. The main body 17 of the spacer 16 is provided with three claw portions 18, and also formed with a pin insertion hole 19 toward the rear part of the car. Thus, a ring-shaped portion having a small width is formed at the rear side with respect to the car body.

The three claw portions 18 of the spacer 16 are latched on cut-away portions 20 formed on the column-side lower bracket 12.

The axially elongated hole 14 of the column-side lower bracket 12, the pin insertion hole 19 of the spacer 16 and the hole 15 of the body-side lower bracket 13 are passed through by a supporting pin 21 and are secured by fastening, or clinching, the pin.

Between the main body 17 of the spacer 16 and the pin insertion hole 19, there is formed a narrow shock time breaking portion 19a which is to be broken due to the shock generated when a predetermined breaking load is applied thereon by the supporting pin 21 at the secondary collision. This narrow shock time breaking portion 19a is extended up to a more forward part of the car body, than the center of the pin insertion hole 19. This narrow shock time breaking portion is not required to be broken both at the upper part and the lower part of the pin insertion hole 19. It is enough if either one of the upper and the lower part or a space between the both parts would be broken. The characteristics of the load of this spacer 16 at the time of breaking are as shown in FIG. 5. FIG. 5 is a load diagram of the spacer, in which the ordinate represents load or force and the abscissa represents movement distance.

Since the structure is as described above, the column-side lower bracket 12 can be moved in a inclined manner together with the steering column 1 at a tilt operation around the supporting pin 21 as the center of the tilting.

At the secondary collision, when the steering column 1 is moved to the front part of the car, the body-side lower bracket 13 and the supporting pin 21 remain stationary; meanwhile, the column-side lower bracket 12 and the main body 17 of the spacer 16 move to the front part of the car together with the steering column 1.

As a result, the ring-shaped shock time breaking portion 19a of spacer 16 is broken by the supporting pin 21, whereby the steering column 1 can be smoothly disconnected from the lower bracket.

After that, the column-side lower bracket 12 is, while the axially elongated hole 14 thereof is engaged with the supporting pin 21, moved to the front part of the car together with the steering column 1. Since the structure is such that the supporting pin 21 is engaged with the axially elongated hole 14 as described above, the steering column 1 is not dropped downward and can be securely guided to the front part of the car.

Since the spacer 16 is formed of synthetic resin, the breaking load of the ring-shaped shock time breaking portion 19a of the spacer 16 (that is, the disconnecting load of the steering column) can be comparatively small.

Since it is the ring-shaped shock time breaking portion 19a of the spacer 16 that is broken and the column-side lower bracket 12 is not broken or deformed even partially, it is possible to smoothly disconnect the steering column 1 without a catch when it is collapsed and to guide the steering column 1 to the front part of the car securely without dropping it downward.

Note that the present invention is not limited to the embodiment described above, but can be altered in various manners.

For example, in the foregoing embodiment, the spacer is interposed between the body-side lower bracket and the column-side lower bracket. However, it is possible to provide the spacer on the upper bracket side, or to provide spacers both on the upper bracket side and the lower bracket side.

Also, in the foregoing embodiment, the spacer is latched on the column-side lower bracket. However, the spacer may be latched on the body-side lower bracket. In this case, the elongated hole is provided on the body-side bracket and the shock time breaking portion is on the spacer on the front side of the car.

The shock time breaking portion 19a may be notched to be easily broken.

As described above, according to the present invention, the spacer is interposed between the column-side bracket and the body-side bracket, and the main body of the spacer is latched on either one of these brackets. On the other hand, the supporting pin is passed through the spacer and the breaking portion which is to be broken when receiving a shock is formed thereat. In a tilt operation, the column-side bracket can be inclined together with the steering column around the supporting pin which serves as the center of tiling.

At the secondary collision, when the steering column is moved to the front part of the car, the body-side bracket and the supporting pin remain stationary; meanwhile, the column-side bracket and the main body of the spacer move to the front part of the car together with the steering column. As a result, the shock time breaking portion of the spacer is broken by the supporting pin, whereby the steering column can be smoothly disconnected from the body-side bracket.

Since the column-side bracket and the body-side bracket corresponding thereto are formed separately, it is easy to design desired configurations and structures therefor and to process the same.

It is the shock time breaking portion of the spacer that is to be broken and the column-side bracket is not broken or deformed even partially, as in the conventional apparatus, so that it is possible to smoothly disconnect the steering column 1 without a catch when it is collapsed and to guide the steering column to the front part of the car securely without dropping it downward.

What is claimed is:

1. A shock absorbing steering column apparatus arranged such that a steering column is secured and supported by body-side upper and lower brackets provided respectively in a rear part and a front part of a vehicle and connected to a vehicle body strength member, column-side upper and lower brackets provided respectively in the rear part and front part of the vehicle and secured to the steering column, a lock mechanism that connects the column-side upper bracket to the body side upper bracket and a supporting pin passed through both of the body-side lower bracket and column-side lower bracket so that the column-side lower bracket is disconnected from the body-side lower bracket at a time of collision to absorb a shock of the collision, characterized in that a spacer is interposed between said body-side lower bracket and said column-side lower bracket so that a main body of the spacer is supported by said column-side lower bracket, the spacer is formed with a pin insertion hole through which the supporting pin is passed, and a portion to be broken by the shock is formed in a region of the spacer surrounding the pin insertion hole.

2. A shock absorbing steering column apparatus according to claim 1, wherein said portion to be broken by the shock comprises a narrowed breaking portion at least part of which is formed rearwardly of the pin insertion hole in a region of the spacer surrounding the pin insertion hole.

3. A shock absorbing steering column apparatus according to claim 2, wherein part of said narrowed breaking portion extends toward the front part of the vehicle past the center of said pin insertion hole.

4. A shock absorbing steering column apparatus according to claim 1, wherein said spacer is formed of synthetic resin.

5. A shock absorbing steering column apparatus according to claim 1, wherein a plastic deformation member for absorbing energy of the shock of the collision is provided between said body-side upper bracket and the vehicle body strength member.

6. A shock absorbing steering column apparatus arranged such that a steering column is secured and supported by body-side upper and lower brackets provided respectively in a rear part and a front part of a vehicle and connected to a vehicle body strength member, column-side upper and lower brackets provided respectively in the rear part and front part of the vehicle and secured to the steering column, a lock mechanism that connects the column-side upper bracket to the body side upper bracket and a supporting pin passed through both of the body-side lower bracket and column-side lower bracket, such that the column-side lower bracket is disconnected from the body-side lower bracket at a time of a collision to absorb the shock of the collision, characterized in that a spacer is interposed between said body-side lower bracket and said column-side lower bracket, the spacer is formed with a pin insertion hole through which the supporting pin is passed, and a portion to be broken by the shock is formed in a region of the spacer surrounding the pin insertion hole.

7. A shock absorbing steering column apparatus according to claim 6, wherein said portion to be broken by the shock comprises a narrowed breaking portion at least part of which is formed rearwardly of the pin insertion hole in a region of the spacer surrounding the pin insertion hole.

8. A shock absorbing steering column apparatus according to claim 7, wherein said narrowed breaking portion extends toward the front part of the vehicle past the center of said pin insertion hole.

9. A shock absorbing steering column apparatus according to claim 6, wherein said spacer is formed of synthetic resin.

10. A shock absorbing steering column apparatus according to claim 6, wherein a plastic deformation member for absorbing energy of the shock of the collision is provided between said body-side upper bracket and the vehicle body strength member.

* * * * *